United States Patent [19]

Goodman et al.

[11] 4,328,474

[45] May 4, 1982

[54] ELECTRICAL ENERGY STORAGE TYPE FILTER

[75] Inventors: James P. Goodman, Annapolis; David B. Boswell, Arnold, both of Md.

[73] Assignee: The United States of America as represented by the Secretary of the Navy, Washington, D.C.

[21] Appl. No.: 115,831

[22] Filed: Jan. 28, 1980

[51] Int. Cl.³ .................. H03H 7/01; H03H 7/06; H02J 3/01
[52] U.S. Cl. .................. 333/176; 333/17 L; 333/181
[58] Field of Search ............ 333/167, 168, 174–176, 333/12, 181, 182–185, 17 R, 17 L, 81 R; 361/113; 307/105; 322/96; 363/39–40, 42, 46, 47

[56] References Cited

U.S. PATENT DOCUMENTS

| | | | |
|---|---|---|---|
| 1,255,387 | 2/1918 | Chubb | 361/113 |
| 1,486,505 | 3/1924 | Wagner | 307/105 X |
| 2,743,412 | 4/1956 | McLean | 322/96 |
| 3,681,612 | 8/1972 | Vogl et al. | 333/12 X |

OTHER PUBLICATIONS

Ghirardi—"Radio Physics Course" Radio and Technical Publishing Co., New York, 1933; pp. 232–235 & title page.
Ghirardi—"Radio Physics Course" Radio and Technical Publishing Co., New York, 1937; title page & pp. 222–223.
Ficchi—"Electrical Interference", Hayden Book Co., Inc., New York; 1964; title page and pp. 48–52.

*Primary Examiner*—Marvin L. Nussbaum
*Attorney, Agent, or Firm*—R. F. Beers; L. A. Marsh

[57] ABSTRACT

The invention is an electrical energy storage type filter which is useful for attenuating harmonic distortion, modulation at high frequencies, line voltage transient sags and surges. The invention structurally consists of a inductance capacitance tank circuit having resistive components and with a resistive element connected in series with the tank circuit. The circuit is tuned to include in its bandwidth the fundamental frequency of the power source and includes in its design consideration of the reactance of the source.

3 Claims, 5 Drawing Figures

ESU
SINGLE PHASE
EQUIV CKT

ESU
DELTA CONNECTION

ESU
WYE CONNECTION

DELTA CONNECTED CIRCUIT

ELECTRICAL ENERGY STORAGE TYPE FILTER

The invention described herein may be manufactured and used by or for the Government of the United States of America for any governmental purposes without the payment of any royalties thereon or therefor.

SUMMARY OF THE INVENTION

This invention relates to a passive electrical filter for alternating electric current (A.C.) circuits or systems. It provides a short-duration energy storage device as well as attenuating load-generated and also source-generated harmonic distortion components, transient voltage disturbances and non-harmonically related components at frequencies higher than the fundamental. The filter functions toward restoring the load voltage to a sine wave of fundamental frequency by countering the effects of nonlinear-load-generated components by providing a low impedance path to shunt these components which would otherwise be transformed into voltage distortions by the system source impedance. The filter also functions toward restoring the load voltage to a sine wave of fundamental frequency in the case of source-generated components by providing a low impedance element which, in proportion to its lower impedance relative to the impedance of the source, attenuates source-generated harmonics, transient disturbances and non-harmonically related components at frequencies higher than the fundamental. Further this filter tends to stabilize the load voltage by supplying energy during short-duration voltages drops and absorbing energy during short-duration voltage rises. Still further this filter tends toward stabilizing voltage regulation of electric systems wherein the load voltage is automatically regulated by special regulating equipment, this by providing a more distortion-free feedback signal from the load voltage to the comparator circuit of the automatic voltage regulating equipment.

OBJECTS OF THE INVENTION

An object of this filter circuit is to attenuate voltage waveform distortion components and transient voltage fluctuations produced in alternating current circuits containing nonlinear load elements and abruptly changing loads on single phase or multi-phase power systems and circuits.

A further object of the invention is to attenuate waveform distortion components and transient voltage fluctuations at the circuit or system load equipment which originate in the source of electric power and have finite source impedances between the source and the load equipment.

A still further object of the invention is to stabilize the load voltage against voltage sags or surges originating from causes either in the loads or the source.

Other objects and many of the attendant advantages of this invention will be readily appreciated as the same becomes better understood by reference to the following detailed description and accompanying drawings wherein:

FIG. 1 is a single-phase diagram of the basic electrical circuit incorporating this invention.

FIG. 2a shows the filter circuit as a single phase equivalent circuit.

FIG. 2b shows the filter circuit applied to a three-phase delta-connected circuit or system.

FIG. 2c shows the filter circuit applied to a three-phase wye-connected circuit or system.

FIG. 3 shows a modified filter circuit applied to a delta-connected circuit or system.

BRIEF DESCRIPTION OF THE DRAWINGS

Referring now to the drawings, wherein like reference characters designate like or corresponding parts, there is shown in FIG. 1 a simplified equivalent circuit 10 incorporating the invention. The circuit consists of a source of A.C. voltage e.g. a source 11, with the circuit drawn to represent the impedance of the voltage source as its resistive and inductive components 11a and 11b respectively. The source 11 could be considered to be a rotating generator, a transformer of a distribution system, a static inverter A.C. device or a line voltage regulator, as examples. The load 12 is also shown as composed of two components, a linear portion 12a and a nonlinear portion 12b. It might also be considered to have a transient or changing portion although this is not specifically shown. The filter or ESU (energy storage unit) 13 includes a tank circuit having a capacitance 14 and an inductance 15 in parallel, with the tank circuit connected in series with a common resistance 16 and the whole filter connected in parallel with the load 12 and the voltage source 11. This showing in FIG. 1 was chosen to facilitate the explanation of the functioning of the filter in the environment of its intended use. The need for this invention arose because it was found that many nonlinear and abruptly changing load elements introduce current harmonics of the fundamental frequency which react with the primarily inductive impedance of the source to generate undesirable voltage characteristics, which in turn can affect the operation of a sensitive load device. In most instances the resistive impedance of the source is very low in comparison with the inductive impedance. The source can therefore be treated as only an inductive impedance especially at frequencies higher than the fundamental without appreciable loss in accuracy. In response to this problem the filters of this invention were developed. In the design the tank circuit 13, the components 14, 15 and 16 are selected to block current flow at the fundamental frequency, i.e., components 14 and 15 are selected in value so as to be equal in impedance (or resonant) at or near the fundamental frequency. The component pair, elements 14 and 15, treated as a single equivalent element, become capacitive at frequencies higher than the fundamental and inductive at frequencies lower than the fundamental. Therefore, a further consideration in choosing the values of elements 14 and 15 so as to be resonant at or near the fundamental frequency, is to also consider the values of the source impedances 11a and 11b so that the filter elements 14, 15 and 16 in combination with the source impedance elements 11a and 11b, altogether result in an equivalent network of sufficiently low impedance to reduce load generated and source generated unwanted frequencies (harmonics, higher frequency modulation sidebands, transient components, etc.) by the amount desired. In order to accomplish this the total impedance of the network composed of elements 14, 15 and 16 is generally lower than the total impedance of the source elements 11a and 11b at the harmonic frequencies. The source elements are mainly internal to the source device, i.e., alternator, transformer, A.C. inverter, etc. but may also include line or cable impedances and/or series impedance elements, either linear or nonlinear, placed in series with the line. The electrical performance of this filter is dependent upon the choice of elements 14, 15 and 16 in relation to the total source impedance. The choice of elements 14 and 15 so as to be resonant at or near the fundamental frequency is desirable for the intended operation of the filter but not sufficient, since for any choice of capacitance, element 14, there exists a corresponding inductance 15, which, together with the capacitance 14 would constitute a resonant pair at the fundamental frequency. The choice of elements 14 and 15 should be such that the source inductance 11b, and elements 14 and 15 altogether are resonant above the fundamental frequency but not below the frequencies at which attenuation is desired. At this resonant point, and in a band of frequencies both above and below this resonant point, there is a relatively high impedance to the flow of load generated currents of these frequencies through the filter and source impedance combination, which result in a rise in magnitude of voltages in the system at these frequencies. It is for this reason that the resistance 16 was introduced into the filter, i.e., to limit the amplification effects in that frequency range. As an example, on a three-phase, 450 volt, 400 Hz 200 kW system, the source inductance 11b was approximately 0.06 millihenries (line-to-neutral equivalent value) and the source resistance 11a was approximately 0.015 ohms (line-to-neutral equivalent value). The filter single-phase equivalent capacitance was 444 microfarads and the filter single phase equivalent inductance 15 was 0.356 millihenries. In this system all frequencies above the fundamental and below 1600 Hz were amplified with the highest amplification being at approximately 1000 Hz. The gain at 1000 Hz was controlled from a gain of approximately 10 (with resistor 16 equal to zero ohms) to a gain of less than 2 (with resistor 16 equal to 0.4 ohms) by variations in gain control resistor 16. It is to be understood that the values used in this example are illustrative only and that for a different application, the specific values for the components will change depending on the system source impedance, load and attenuation characteristics desired by employing this filter. To counter the effect of resistor 16 adversely affecting the attenuation at higher frequencies it is possible to use a shunt capacity 17 which is of a value to respond to high frequencies while providing no significant effect on the gain control characteristics of resistor 16.

As can be seen the value of resistance 16 must be quite low, in most applications it is between 15 and 50% of the value of the impedance of either 14 or 15 at the fundamental frequency. Ideally the filter would function better as a means for attenuating harmonic distortion if resistor 16 could be omitted, therefore it is made to have as small a resistive impedance as is consistent with its function, described above.

Figure 1:
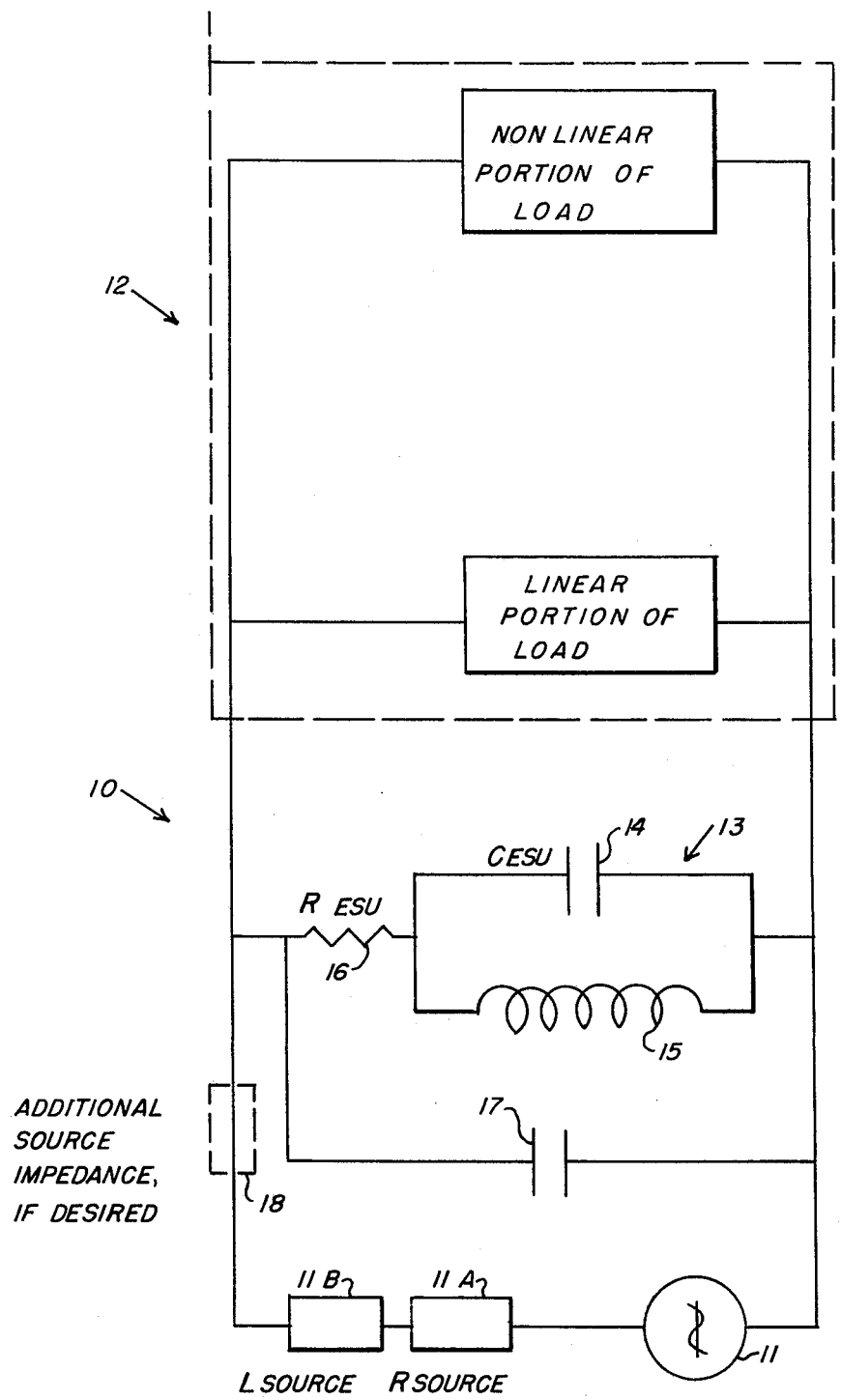
Figure 2A:
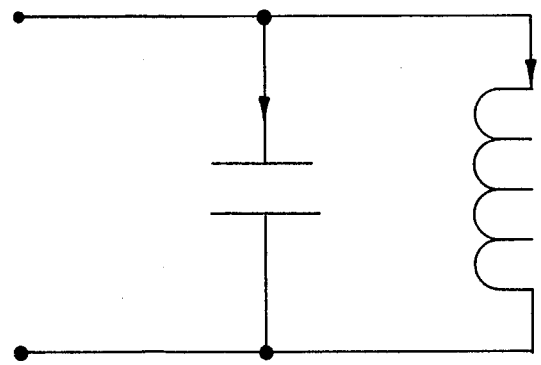
Figure 2B:
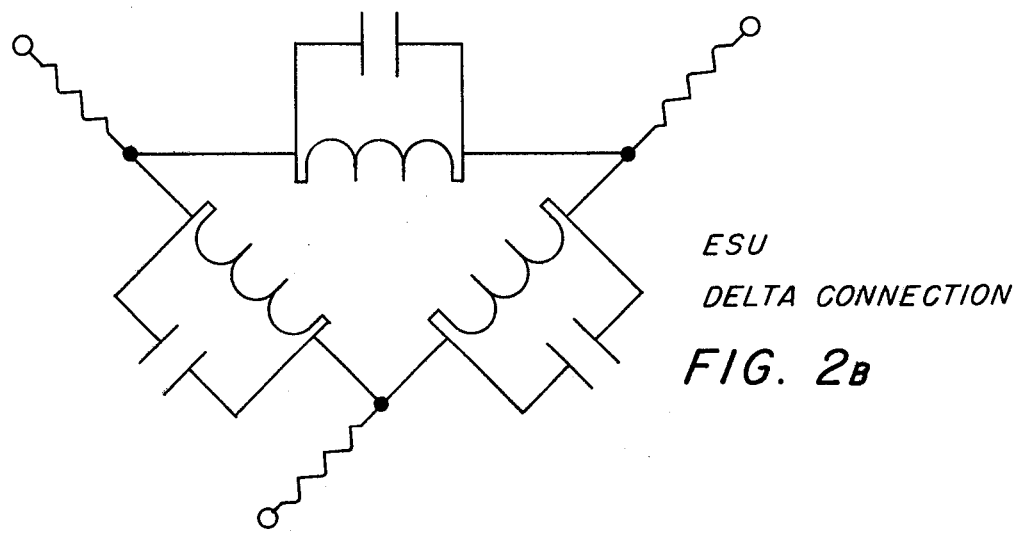
Figure 2C:
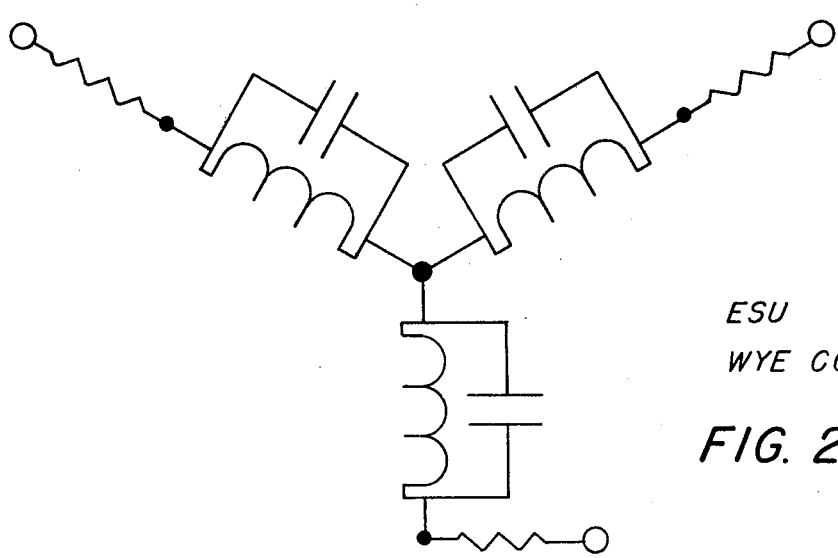
Figure 3:
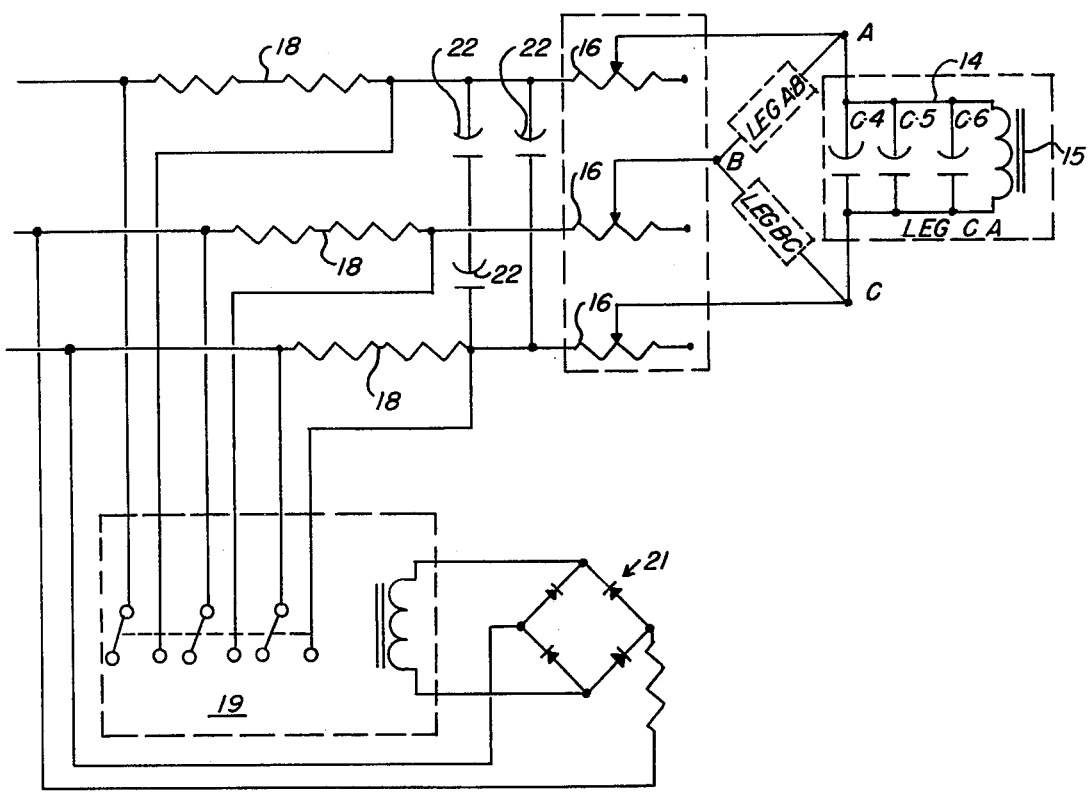

A particular example of the application of the invention will be described in reference to FIG. 3. In this circuit there are three filter elements, one for each branch of the three phase delta-connected circuit in which the capacitance 14 was 75 $\mu f$ (C4, C5 and C6 were 25 $\mu f$ each) while the inductance 15 was 1.91 mH and the resistances 16 were 0.25 $\Omega$. In this example the impedance 18, indicated as optional in FIG. 1, by showing it in dotted lines, was used to limit the inrush of current into the filter upon energization, had a value of 0.5 and was shorted after about 25 msec by the operation of a relay 19 powered by a diode bridge 21. This circuit also incorporates the shunt capacitors 22 which have a capacitance of 10 $\mu f$. The circuits of FIGS. 2a, 2b, and 2c were included to show that the invention could be used with all commonly used power circuits. It is also within the scope of this invention to use the filter circuits in multiple parallel arrangements.

Obviously many modifications and variations of the present invention are possible in the light of the above teachings. It is therefore to be understood that within the scope of the appended claims, the invention may be practiced otherwise than as specifically described herein.

What is claimed is:

1. A filter circuit for use in an alternating current power circuit or system for attenuating unwanted distortion components, transient components, and nonharmonically related electrical components originating either in the source or in the load comprising:
   one or more resonant tank circuits, each having an inductance and a capacitance in parallel and tuned at or near the fundamental frequency of the power circuit;
   a shorting capacitor in parallel with the tank circuit across the power circuit to pass the high frequency harmonics;
   a resistance having an ohmic value of usually between 5 and 50% of the impedance value of either the inductance or the capacitance of the tank circuit at the fundamental frequency and connected in series with each of the tank circuits; and
   said tank circuits and said resistor being connected across the power source in parallel with the load.

2. A filter as claimed in claim 1 which includes an additional series line impedance which is similar to but higher than the system source impedance for the purpose of reducing the size of the filter required when the source is a high power system and the load is of relatively low power demand.

3. A filter system as claimed in claim 1 which includes an impedance limiting selectively connected in series in the power line to limit the current flow upon energizing the circuit with the filter; and
   means to remove the limiting impedance from the circuit.

* * * * *